United States Patent
Western et al.

(10) Patent No.: US 11,566,936 B1
(45) Date of Patent: Jan. 31, 2023

(54) METHOD AND APPARATUS TO NON-INTRUSIVELY MEASURE THE WEIGHT OF LOOSE BULK MATERIAL WITHIN A RIGID CONTAINING STRUCTURE

(71) Applicant: Munters Corporation, Amesbury, MA (US)

(72) Inventors: Bryon Western, West Fork, AR (US); Edgar Cilio, Farmington, AR (US)

(73) Assignee: Munters Corporation, Amesbury, MA (US)

( * ) Notice: Subject to any disclaimer, the term of this patent is extended or adjusted under 35 U.S.C. 154(b) by 0 days.

(21) Appl. No.: 16/933,371

(22) Filed: Jul. 20, 2020

Related U.S. Application Data

(63) Continuation-in-part of application No. 16/529,291, filed on Aug. 1, 2019, now abandoned, which is a continuation-in-part of application No. 15/431,159, filed on Feb. 13, 2017, now abandoned.

(60) Provisional application No. 62/294,635, filed on Feb. 12, 2016.

(51) Int. Cl.
*G01H 1/00* (2006.01)
*G01G 23/01* (2006.01)
*G01V 1/00* (2006.01)

(52) U.S. Cl.
CPC ............. *G01H 1/00* (2013.01); *G01G 23/012* (2013.01); *G01V 1/001* (2013.01)

(58) Field of Classification Search
CPC ......... G01G 23/012; G01V 1/001; G01H 1/00
See application file for complete search history.

(56) References Cited

U.S. PATENT DOCUMENTS

| | | | |
|---|---|---|---|
| 3,795,146 A * | 3/1974 | Wilson | G01F 23/263 73/304 C |
| 4,480,468 A | 11/1984 | Sinha | |
| 5,755,136 A | 5/1998 | Getman et al. | |
| 6,339,960 B1 | 1/2002 | Costley et al. | |
| 6,439,053 B1* | 8/2002 | Bobulski | G01N 29/348 73/659 |
| 6,443,004 B1 | 9/2002 | Heuft et al. | |
| 6,631,639 B1 | 10/2003 | Dam et al. | |
| 6,642,722 B2 | 11/2003 | Raffalt et al. | |
| 6,997,052 B2 | 2/2006 | Woehrle | |
| 7,039,530 B2 | 5/2006 | Bailey et al. | |
| 7,162,922 B2 | 1/2007 | Freger et al. | |
| 7,216,536 B2 | 5/2007 | Young et al. | |
| 7,481,106 B2 | 1/2009 | Freger | |

(Continued)

FOREIGN PATENT DOCUMENTS

| | | | |
|---|---|---|---|
| DE | 10136754 A1 | 7/2001 | ............ 9/24 |
| EP | 0119790 A1 | 3/1984 | ............ 23/22 |

(Continued)

OTHER PUBLICATIONS

Anslinger, et al. "Mobile sensor concept for acoustic level estimation in bulk solids silos." 2018 IEEE Sensors Applications Symposium (SAS). IEEE, 2018.

*Primary Examiner* — Tarun Sinha
(74) *Attorney, Agent, or Firm* — Venable LLP

(57) ABSTRACT

A method and system can measure the weight of a bulk material within a container by applying excitation in the form of vibrational energy and interpreting the container's response to the vibration.

20 Claims, 4 Drawing Sheets

(56) References Cited

U.S. PATENT DOCUMENTS

| | | |
|---|---|---|
| 7,487,057 B2 | 2/2009 | Heilig et al. |
| 7,578,183 B2 | 8/2009 | Young et al. |
| 7,946,168 B2 | 5/2011 | Young et al. |
| 8,037,753 B2 | 10/2011 | Fehrenbach et al. |
| 8,069,720 B2 | 12/2011 | Isenmann et al. |
| 8,448,509 B2 | 5/2013 | Elofsson et al. |
| 8,571,829 B2 | 10/2013 | Atlas et al. .................. 702/174 |
| 8,850,881 B2 | 10/2014 | Song et al. |
| 8,850,882 B2 | 10/2014 | Qu et al. |
| 9,109,997 B2 | 8/2015 | Urban |
| 9,395,228 B2 | 7/2016 | Molitor et al. |
| 9,546,916 B1 | 1/2017 | Crane et al. .................. 374/150 |
| 9,784,608 B2 | 10/2017 | Luber at al. |
| 10,139,328 B2 | 11/2018 | Ladner |
| 10,451,467 B2 | 10/2019 | Otagaki et al. |
| 2001/0006318 A1 | 7/2001 | Getman et al. ............... 310/313 |
| 2004/0183550 A1 | 9/2004 | Fehrenbach et al. |
| 2005/0071113 A1 | 3/2005 | Heilig |
| 2006/0042386 A1 | 3/2006 | Young et al. |
| 2007/0006652 A1 | 1/2007 | Weldon, Jr. et al. |
| 2008/0011287 A1 | 1/2008 | Staiger |
| 2010/0161253 A1 | 6/2010 | Allan .............................. 702/56 |
| 2014/0157889 A1 | 6/2014 | Eakin .............................. 73/296 |
| 2015/0253178 A1 | 9/2015 | Ligneul et al. |
| 2016/0161320 A1 | 6/2016 | Ohmayer et al. |
| 2020/0292371 A1 | 9/2020 | Tomizawa et al. |
| 2021/0285807 A1 | 9/2021 | Ward |

FOREIGN PATENT DOCUMENTS

| | | |
|---|---|---|
| EP | 1 059 516 A1 | 12/2000 |
| EP | 1 800 093 B1 | 2/2016 |
| EP | 3 514 508 A1 | 7/2019 |
| EP | 3 620 757 A1 | 3/2020 |
| EP | 3 470 802 B1 | 3/2021 |
| WO | 2007/073837 A2 | 7/2007 |

\* cited by examiner

METHOD AND APPARATUS TO NON-INTRUSIVELY MEASURE THE WEIGHT OF LOOSE BULK MATERIAL WITHIN A RIGID CONTAINING STRUCTURE

CROSS-REFERENCE TO RELATED APPLICATIONS

This application claims priority to and is a continuation-in-part of U.S. patent application Ser. No. 16/529,291, filed on Aug. 1, 2019 entitled A METHOD AND APPARATUS TO NON-INTRUSIVELY MEASURE THE WEIGHT OF LOOSE BULK MATERIAL WITHIN A RIGID CONTAINING STRUCTURE which is a continuation-in-part of U.S. patent application Ser. No. 15/431,159, filed on Feb. 13, 2017 entitled A METHOD AND APPARATUS TO NON-INTRUSIVELY MEASURE THE WEIGHT OF LOOSE BULK MATERIAL WITHIN A RIGID CONTAINING STRUCTURE which is a continuation-in-part of U.S. Provisional Patent Application Ser. No. 62/294,635, filed on Feb. 12, 2016 entitled A METHOD AND APPARATUS TO NON-INTRUSIVELY MEASURE THE WEIGHT OF LOOSE BULK MATERIAL WITHIN A RIGID CONTAINING STRUCTURE all of which is hereby incorporated by reference in its entirety.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

I. Field of the Invention

The present invention relates to improvements in measuring the amount of a bulk material within a container in a non-intrusive manner. In particular, the present invention relates to applying excitation in the form of vibrational energy and interpreting the container's response to the vibration to determine the amount of bulk material.

2. Description of the Known Art

As will be appreciated by those skilled in the art, vibrational sensors are known in various forms. Patents disclosing information relevant to vibration al sensing include:

U.S. Pat. No. 8,571,829, issued to Atlas, et al. on Oct. 29, 2013 entitled Detecting objects in shipping containers by vibration spectral analysis. The abstract states: Objects in a cargo shipping container are detected by measuring vibration resonant frequency peaks of the container. The mass of an object on the floor of the container effects the vibration resonance of the container, enabling the object to be detected. A vibration source and a plurality of accelerometers are either attached to the steel structure of the container, or are disposed on a supporting structure, such as a cargo crane or lift, so that they contact the container. The vibration source causes the container to vibrate, and the accelerometers detect the vibration resonance of the container. A mismatch between a cargo manifest and an observed cargo, or detection of an object having relatively high mass, e.g., due to lead shielding, can justify a manual inspection. The process uses synchronous processing to achieve the sensitivity needed, is unobtrusive, and does not slow the flow of cargo through a facility.

United States Patent Application No. 20140157889A1, filed by Eakin; George R., published on Jun. 12, 2014 entitled SYSTEM FOR MEASURING LEVEL OF DRY BULK MATERIAL IN CONTAINER. The abstract reads: A system for measuring a level of dry bulk material within a container has a columnar device supported vertically within the container. The columnar device has a closed lower end and openings through a sidewall thereof for allowing dry bulk material within the container to flow into and out of the columnar device. A load cell is used to measure a weight of the dry bulk material within the columnar device, which is then correlated to the level of dry bulk solids within the container. The columnar device and the sidewall openings therein can be provided in various shapes and configurations.

European patent publication number EP0119790 A1, invented by Peter Atkinson, filed on Mar. 8, 1984 entitled Liquid level monitoring. The abstract reads: The level of liquid in a container, for example an upright cylinder of the kind used to store liquefied gas, is monitored by measuring the resonant frequency of the container and comparing it with a pre-determined standard. The resonant frequency is measured by applying mechanical vibrations, preferably of a frequency up to 1 OkHz, to the container and monitoring the resonant frequency using known methods. The results obtained are compared with the pre-determined standard, which is for example a calibration graph, to determine accurately the degree of filling of the container.

German patent publication number DE10136754 A1, invented by Mario Bechtold, and Markus Vester, field on Jul. 27, 2001, entitled Verfahren and Vorrichtung zur Dichtebestimmung. The machine translation of the title is Density measurement for medium in container, comprises feeding questioning signal into probe and then detecting response signal. The machine translation of the abstract reads: Determining the density of a medium (30) in a container (20) comprises using a probe (10). A questioning signal (S1) is fed into the probe and a response signal (S2) is detected. A medium reflection factor or impedance is determined along the probe, based on the response time, and the density along the probe is determined using these values. The questioning signal band width is at least 50 MHz, especially 100 MHz.

Each of these patents and publications are hereby expressly incorporated by reference in their entirety.

From these prior references it may be seen that these prior art patents are very limited in their teaching and utilization, and an improved sensor method and apparatus is needed to overcome these limitations.

SUMMARY OF THE INVENTION

The present invention is directed to an improved vibrating energy phase shift measuring apparatus using a vibration source and a vibration sensor. The invention described herein is used to determine the level of feed content in a feeder silos used in commercial farming. Feed weight in the silo is determined by measuring and analyzing vibration profiles of the container when a known excitation is applied. A vibration source and at least one vibration sensor are placed on the structure. The vibration source is used to apply a predetermined vibration signal to the silo. The vibration source applies a variable vibration frequency that sweeps through the natural resonant frequency of the silo. The energy transferred from the vibration source to the vibration sensors is inversely proportional to the weight of the feed in the silo. The weight of the feed dampens the vibration so less energy reaches the sensor. Programming the vibration source to sweep through the resonant frequency of the silo induces the greatest possible vibration amplitude, and allows for the dampening effect of increased feed weight to be measured by calculating the quality factor (Q) of the oscillation of the silo.

For a given size of container, the vibration response will be calibrated. The calibration procedure involves starting with an empty silo and transferring known quantities of feed to the silo and taking vibration measurements at each step. This calibration procedure does not need to be completed for individual silos, only once for a given type of silo.

Overall, the system comprises a power source or power interface, at least one microcontroller, at least one accelerometer, at least one vibration excitation device, a transmitter, and a mechanical coupling mechanism. The system is packaged utilizing known methods for weather proofing. The packaging attaches to the silo through magnetic or mechanical fasteners. The steps for the method include:

1) Provide mechanical excitation to a rigid feed container.
2) Use a vibration sensor to measure the vibration response.
3) Calculate the frequency spectrum of the vibration response.
4) Determine the energy in the signal from the time or frequency domain.
5) Determine the volume of bulk material based on the frequency spectrum, signal amplitude, and previously obtained calibration data.
6) Transmit the calculated information to a receiver.

In this manner, remote sensing of feed quantities can be communicated to a feed supply manager to ensure timely delivery of feed and allow remote management of feed supplies. These and other objects and advantages of the present invention, along with features of novelty appurtenant thereto, will appear or become apparent by reviewing the following detailed description of the invention.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

Figure 1:
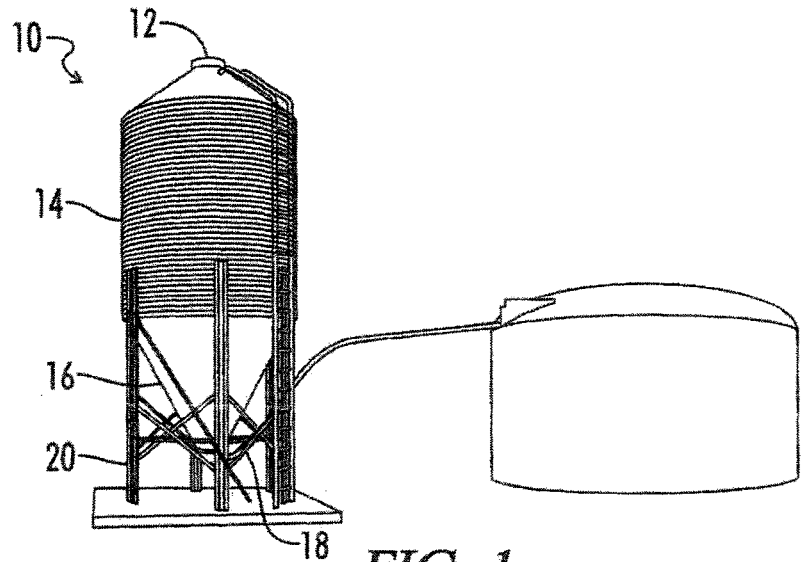
FIG. 1 is a perspective view of a typical galvanized metal feed silo with upper cylinder, bottom cone feed auger, and metal stand.

As shown in FIGS. 1 through 5 of the drawings, one exemplary embodiment of the present invention is generally shown as a vibrating energy phase shift measuring apparatus 100. The embodiment described herein is being placed on a galvanized metal silo 10. The silo 10 includes a silo roof 12, silo body 14 that houses the feed 15, a bottom cone 16 that angularly directs the feed 15 to a feed auger 18, and a metal frame or stand 20 supporting the silo off of the concrete base or ground.

Figure 2:
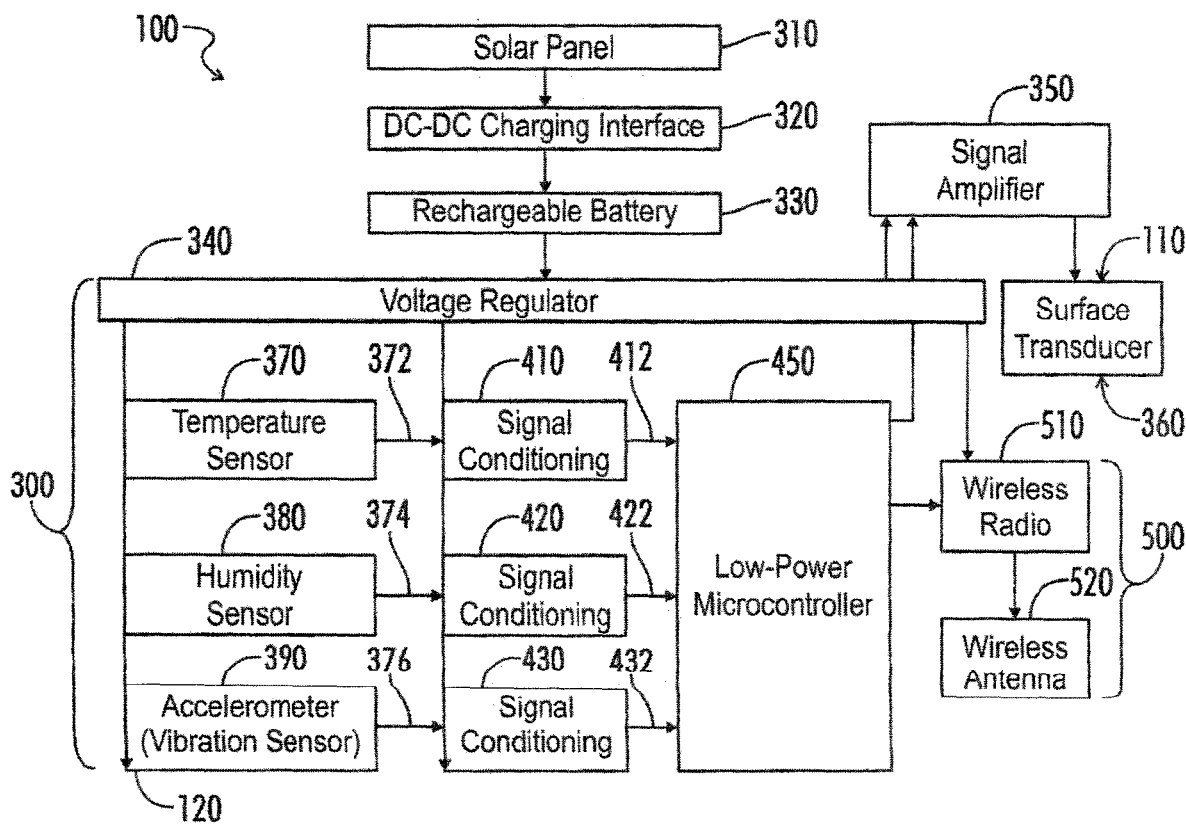
FIG. 2 is an electrical block diagram for one embodiment of the present invention.
Figure 3:
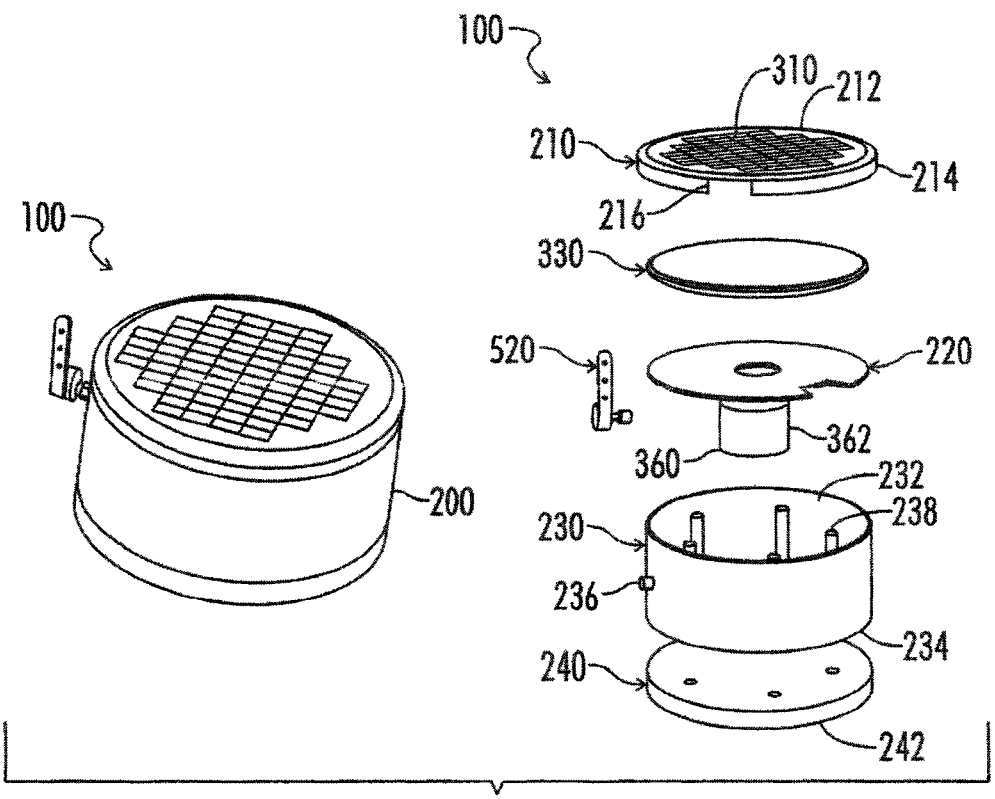
FIG. 3 is a packaging design for one embodiment of the invention.
Figure 4:
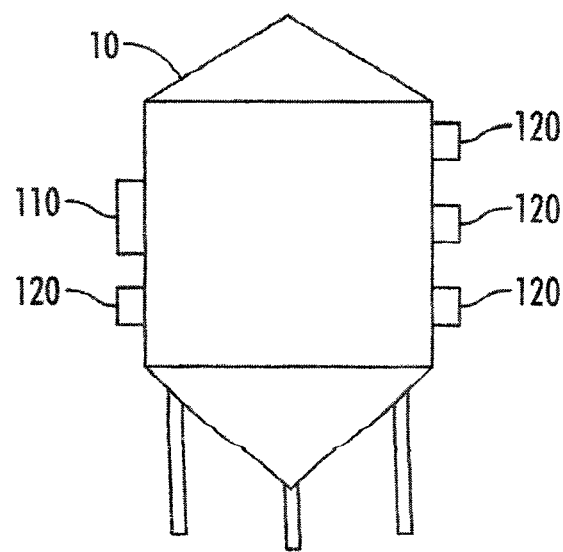
FIG. 4 is a schematic diagram of the feed silo of FIG. 1 with the non-intrusive feed volume measuring apparatus.

The block diagram of FIG. 2 and the exploded view of FIG. 3 shows the major components of the vibrating energy phase shift measuring apparatus 100. In the combined embodiment, the vibrating energy phase shift measuring apparatus 100 includes both a vibration source 110 and vibration sensor 120 which may be combined into a single housing. Alternatively, as shown in FIG. 4, separate housings may be used for the vibration source 110 and vibration sensor 120. In the embodiment shown in FIGS. 2 and 3, a single unit is provided that has both the vibration source 110 and vibration sensor 120 where they can be either be alternately timed for operation or the microprocessor can selectively control for one aspect of the unit to be switched off so that the unit becomes either a source or a sensor as needed. If the separate packaging is provided for the excitation circuitry from the measurement circuitry, multiple measurement units can be distributed along the container, see FIG. 4, which could potentially lead to higher accuracy measurements.

FIG. 3 shows the housing 200 for containing the system components. In this embodiment, the housing 200 is a metal housing. The preferred embodiment of the packaging includes an alignment and registration feature to minimize variation in placement on the silo 10 in the field. The housing 200 includes an upper lid 210 with a top surface 212 and a side wall 214 defining an alignment aperture 216. Below the lid is a printed circuit board 220 containing the electrical components other than the solar panel 310, battery 330, and antenna 520. The housing body 230 defines a lid aperture 232 and base aperture 234 and supports the antenna mount 236. In addition, circuit standoffs 238 are molded into the housing to hold the printed circuit board 220.

The base 240 is secured to the housing body 230 and retains a base magnet 242. In this manner, the base 240 of the housing 200 is magnetic to allow for easy attachment to the metal feed towers 10. The magnet used for mechanically attaching the system to the metal silo can be replaced with other mechanisms such as clamps, adhesives, bolts, or rivets.

The electrical components 300 are best understood from the block diagram of FIG. 2, but their placement can be understood by referring to FIG. 3. A solar panel 310 is provided attached to or integrated into the lid 210. In this manner, the battery 330 of the preferred embodiment is charged using the solar panel 310. A wind generator can also be used to replace the solar panel to keep the battery charged. The solar panel is electrically connected to a charging interface 320 that charges the power storage 330.

The power storage 330 is commonly referred to as a battery, but a capacitor bank or other energy storage could be utilized. The battery power can also be replaced by power available through a distribution system such as 120V mains or a distributed industrial 24 V DC. These would require different circuit blocks to interface them to the electronics such as an AC/DC converter and a DC/DC converter, respectively.

In this embodiment, the electrical system is powered by a rechargeable battery 330 which interfaces with the electrical components through a voltage regulator 340. The voltage regulator 340 provides power through electrical connections to the signal amplifier 350 sensors 370, 380, 390, signal conditioners 410, 420, 430, microprocessor or microcontroller 450, and transmitter 500. The wireless transmitter could be replaced by a wired transmission such as a 4-20 mA current loop, which is often deployed in industrial environments in the form of a multi-node HART communication system.

The vibration source 360 for the preferred embodiment is a surface transducer 362 that is controlled through the interaction of the microcontroller 450 and a speed controller or signal amplifier 364. The surface transducer as the vibration excitation source could be replaced by a vibration motor or an electrically actuated impact hammer.

The electrical components include a set of sensors 370, 380, 390 comprising at least one accelerometer 390 for measuring vibration, but can also include other sensors such as a humidity sensor 380 and temperature sensor 370 that can be used to compensate for environmental factors on the vibration signature of the structure 10. Additionally, the temperature sensor 370 and humidity sensor 380 can be used to ensure that feed is properly stored within acceptable parameters. For example, excessive heat or moisture can be detected by these sensors to indicate decomposition of the feed, the accidentally left open silo top that allows rain into the silo, or other factors that may affect the quality of feed being delivered. The temperature sensor 370 generates a temperature signal 372, the humidity sensor 380 generates a humidity signal 374, and the accelerometer 390 generates a vibration signal 376. The temperature signal 372 passes through a temperature signal conditioner 410 to generate a temperature conditioned signal 412 that is provided to the microcontroller 450. The humidity signal 374 passes through a humidity signal conditioner 420 to generate a humidity conditioned signal 422 that is provided to the microcontroller 450. The vibration signal 376 passes through a vibration signal conditioner 430 to generate a vibration conditioned signal 432 that is provided to the microcontroller 450.

The core of the system is based around a microcontroller 450 which analyzes the sensor information and sends the processed or raw data to the transmitter 500 where it is broadcast. The transmitter 500 includes a wireless radio 510 using a wireless antenna 520 that is attached to the housing body 230 and an appropriate receiver 550 is used to capture the transmitted signal 540.

Figure 5:
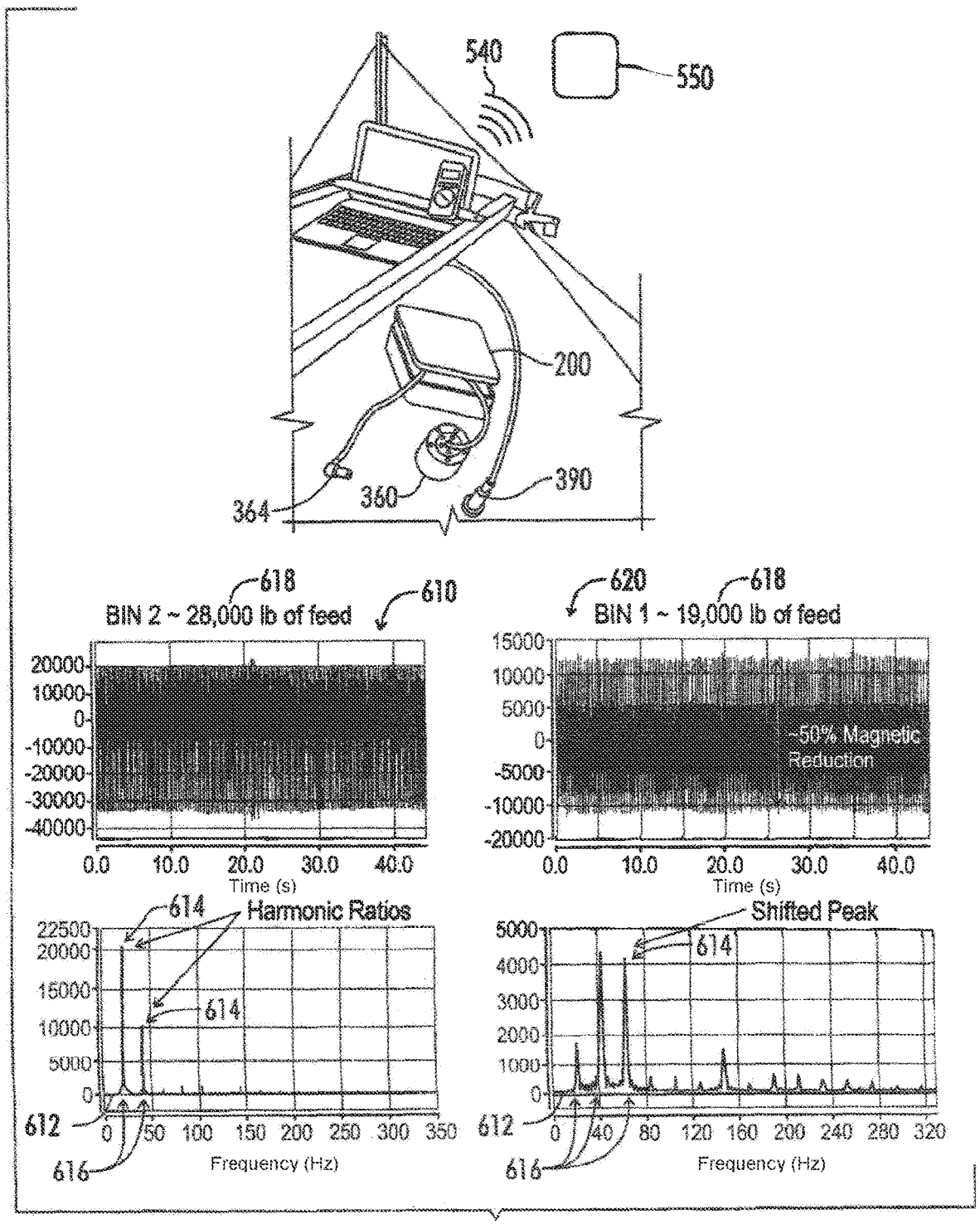
FIG. 5 is a schematic view and chart showing the measurement of shifted peaks associated with changes in feed levels inside the silo.
Figure 6:
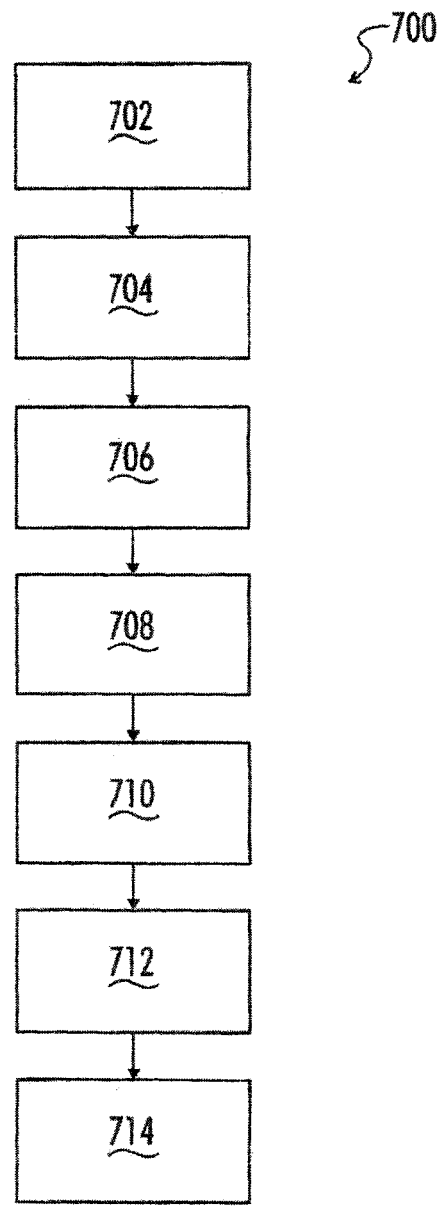
FIG. 6 is a schematic view of the method of the present invention.

FIG. 5 shows the prototype unit and the vibration chart 600 generating the first signal profile 610 and the second signal profile 620. The first signal profile 610 includes a first harmonic profile 612 that includes first peak values 614 and first peak frequencies 616 which are indicative of an associated first feed quantity 618. The second signal profile 620 includes a second harmonic profile 612 that includes second peak values 614 and second peak frequencies 616 for an associated second feed quantity 618. The Fast Fourier Transform data shown in FIG. 5 shows an increase in peak resonant frequency from the largest first peak value 614 above 20,000 at the first peak frequency 616 of approximately 24 hertz at an estimated twenty eight thousand pounds of feed to the second peak value 614 between 4000 and 4500 at the second peak frequency 616 of approximately 42 Hertz at nineteen thousand pounds. Note that this is a shift both in amplitude of the signal profile and in the frequency $9f$ the signal profile which provides a unique signature for feed weight and volume. Thus, a lower frequency maximum peak is indicative of more feed in the container due to the dampening effect, and the higher peak at this lower frequency is also indicative of more feed in the container concentrating the energy into a lower frequency profile. This can also be understood by viewing the lack of upper harmonics in the 28000 lb feed chart. This profile data can be initially collected to create a reference profile, and the newly measured signal can be compared against either the initially collected profile or a previous signal to measure the change and calculate the current feed supply in the silo.

The legitimacy of the approach has been verified through the embodiment shown in FIG. 5. The vibration excitation apparatus was a simple vibrational motor. The housing was a custom designed part that was three dimensionally printed so that the motor could be mounted with a neodymium magnet. The vibration sensor was a three axis accelerometer with an eight kilohertz bandwidth provided with a vibration analyzer package particular to the accelerometer. The computer was used to collect and analyze the vibration data.

The steps for the silo vibration method 700 include providing 702 a vibrating energy phase shift measuring apparatus with a vibration source and a vibration sensor, applying 704 mechanical excitation to a rigid feed container, measuring 706 the vibration response with a vibration sensor, the temperature in the rigid feed container, and the humidity in the rigid feed container, calculating 708 the frequency spectrum of the vibration response, determining the energy 710 in the signal from the time or frequency domain, determining the volume 712 of bulk material based on the frequency spectrum, signal amplitude, and previously obtained calibration data; and transmitting 714 the calculated information with or without the temperature and with or without the humidity information to be received at a receiver.

Reference numerals used throughout the detailed description and the drawings correspond to the following elements:
Galvanized metal silo 10
  Silo roof 12
  Silo body 14
  Bottom cone 16
  Feed auger 18
  Stand 20
vibrating energy phase shift measuring apparatus 100
  vibration source 110
  vibration sensor 120
housing 200
  upper lid 210
    top surface 212
    side wall 214
      antenna aperture 216
  printed circuit board 220
  housing body 230
    lid aperture 232
    base aperture 234
    antenna mount 236
    circuit standoffs 238
  base 240
    base magnet 242 electrical components 300
solar panel 310
charging interface 320
power storage 330
voltage regulator 340
signal amplifier 350
vibration source 360
   surface transducer 362
   speed controller 364
temperature sensor 370
   temperature signal 372
humidity sensor 380
   humidity signal 374
accelerometer 390
   vibration signal 376
temperature signal conditioner 410
   temperature conditioned signal 412
humidity signal conditioner 420
   humidity conditioned signal 422
vibration signal conditioner 430
   vibration conditioned signal 432
microcontroller 450
transmitter 500
wireless radio 510
wireless antenna 520
transmitted signal 540
receiver 550
vibration chart 600
   first signal profile 610
     first harmonic profile 612
     first peak values 614
     first peak frequencies 616
     associated first feed quantity 618
   second signal profile 620
     second harmonic profile 612
     second peak values 614
     second peak frequencies 616
     associated second feed quantity 618
silo vibration method 700
providing a vibrating energy phase shift measuring apparatus 702
applying mechanical excitation 704
measuring the vibration response 706
calculating the frequency spectrum 708
deter mining the energy 710
determining the volume 712
transmitting the calculated information 714

From the foregoing, it will be seen that this invention well adapted to obtain all the ends and objects herein set forth, together with other advantages which are inherent to the structure. It will also be understood that certain features and subcombinations are of utility and may be employed without reference to other features and subcombinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense.

When interpreting the claims of this application, method claims may be recognized by the explicit use of the word 'method' in the preamble of the claims and the use of the 'ing' tense of the active word. Method claims should not be interpreted to have particular steps in a particular order unless the claim element specifically refers to a previous element, a previous action, or the result of a previous action. Apparatus claims may be recognized by the use of the word 'apparatus' in the preamble of the claim and should not be interpreted to have 'means plus function language' unless the word 'means' is specifically used in the claim element. The words 'defining,' 'having,' or 'including' should be interpreted as open ended claim language that allows additional elements or structures. Finally, where the claims recite "a" or "a first" element of the equivalent thereof, such claims should be understood to include incorporation of one or more such elements, neither requiring nor excluding two or more such elements.

What is claimed is:

1. A loose bulk material estimating apparatus for use with a rigid containing structure having a natural resonant frequency that varies with a change in volume or weight of stored bulk material and is highest when the rigid containing structure is empty, the apparatus comprising:
a housing mountable to the rigid containing structure;
at least one excitation apparatus mounted in the housing, the at least one excitation apparatus applying vibration to the rigid containing structure based on a predetermined vibration signal;
at least one vibration sensor mounted in the housing and positioned to measure vibration of the rigid containing structure; and
at least one microcontroller storing at least one first signal profile as a reference signal profile and defining a first harmonic profile including first peak amplitude values and first peak frequencies, wherein
the at least one vibration sensor is communicatively connected to the microcontroller,
the at least one vibration sensor measures a second signal profile defining a second harmonic profile including second peak amplitude values and second peak frequencies, and
the microcontroller compares the at least one first signal profile and the second signal profile and determines a phase shift of the oscillation by comparing at least one of the first peak amplitude values and the second peak amplitude values and the first peak frequencies and the second peak frequencies.

2. The apparatus of claim 1,
wherein the at least one excitation apparatus comprises a surface transducer.

3. The apparatus of claim 1,
wherein the at least one excitation apparatus comprises a vibrational motor.

4. The apparatus of claim 3,
wherein the vibrational motor is controlled by a speed controller.

5. The apparatus of claim 1, further comprising:
a temperature sensor electrically connected to the microcontroller.

6. The apparatus of claim 1, further comprising:
a humidity sensor electrically connected to the microcontroller.

7. The apparatus of claim 1, wherein the predetermined vibration signal comprises a varying vibration frequency that sweeps through the natural resonant frequency of the rigid containing structure.

8. The apparatus of claim 1, wherein the microcontroller compares both the first peak amplitude values and the second peak amplitude values and the first peak frequencies and the second peak frequencies.

9. The apparatus of claim 1, wherein the at least one first signal profile as the reference signal profile is determined from measurements from the at least one vibration sensor after the at least one excitation apparatus applies the vibration to the rigid containing structure.

10. A loose bulk material estimating apparatus for use with a rigid containing structure having a natural resonant frequency that varies with a change in volume or weight of stored bulk material and is highest when the rigid containing structure is empty, the apparatus comprising:
- at least one excitation apparatus configured to apply vibration to the rigid containing structure based on a predetermined vibration signal;
- at least one vibration sensor configured to measure vibration of the rigid containing structure in terms of at least one of signal amplitude and signal frequency; and
- at least one microcontroller storing calibration data, wherein
- the at least one vibration sensor is communicatively connected to the microcontroller, and
- the microcontroller receives at least one of current signal amplitudes and current signal frequencies from the at least one vibration sensor, generates a current signal profile based on the at least one of current signal amplitudes and current signal frequencies from the at least one vibration sensor, and determines an amount of the stored bulk material based on the current signal profile, the current signal amplitudes, and the calibration data.

11. The apparatus of claim 10, wherein the at least one excitation apparatus comprises one of a surface transducer and a vibrational motor.

12. The apparatus of claim 10, wherein the vibrational motor is controlled by a speed controller.

13. The apparatus of claim 10, further comprising:
- a temperature sensor electrically connected to the microcontroller.

14. The apparatus of claim 10, further comprising:
- a humidity sensor electrically connected to the microcontroller.

15. The apparatus of claim 10, wherein the predetermined vibration signal comprises a varying vibration frequency that sweeps through the natural resonant frequency of the rigid containing structure.

16. The apparatus of claim 1, wherein the current signal profile generated by the microcontroller includes at least one of a time domain and a frequency domain.

17. The apparatus of claim 16, wherein the microcontroller generates the current signal profile using Fast Fourier transform.

18. A loose bulk material estimating method for use with a rigid containing structure having a natural resonant frequency with the greatest vibrational amplitude that varies with a change in volume or weight of stored bulk material and is highest when the rigid containing structure is empty, the method comprising:
- applying vibration to the rigid containing structure based on a predetermined vibration signal using at least one excitation apparatus;
- measuring vibration of the rigid containing structure using at least one vibration sensor;
- storing at least one first signal profile as a reference signal profile and defining a first harmonic profile including first peak amplitude values and first peak frequencies;
- measuring a second signal profile defining a second harmonic profile including second peak amplitude values and second peak frequencies using the at least one vibration sensor; and
- comparing the at least one first signal profile and the second signal profile and determining a phase shift of the oscillation by comparing at least one of the first peak amplitude values and the second peak amplitude values and the first peak frequencies and the second peak frequencies.

19. The method of claim 18, wherein both the first peak amplitude values and the second peak amplitude values and the first peak frequencies and the second peak frequencies are compared.

20. The method of claim 18, wherein the at least one first signal profile as the reference signal profile is determined from measurements from the at least one vibration sensor after the at least one excitation apparatus applies the vibration to the rigid containing structure.

* * * * *